United States Patent [19]

Klosel

[11] 4,062,139
[45] Dec. 13, 1977

[54] ERECTABLE SIGN FOR INDICATING EMERGENCY IN MOTOR VEHICLE TRAFFIC

[76] Inventor: Georg W. Klösel, Falkensteiner Strasse 12, 624 Konigstein, Germany

[21] Appl. No.: 746,333

[22] Filed: Dec. 1, 1976

[30] Foreign Application Priority Data

Nov. 20, 1975 Germany ............................. 7536870

[51] Int. Cl.² ......................... G09F 1/06; G09F 21/04
[52] U.S. Cl. .................... 40/129 C; 40/124.1; 40/104.02
[58] Field of Search ......................... 116/28 R, 114 K; 40/125 A, 129 C, 126 A, 124.1, 102, 104.02

[56] References Cited

U.S. PATENT DOCUMENTS

| | | | |
|---|---|---|---|
| 1,499,661 | 7/1924 | Hurst | 40/124.1 |
| 2,056,338 | 10/1936 | Bachrach | 40/102 |
| 3,248,806 | 5/1966 | Schrader | 40/102 X |
| 3,256,628 | 6/1966 | Green | 40/124.1 |
| 3,292,291 | 12/1966 | Kelly | 40/129 C |
| 3,471,958 | 10/1969 | Westin | 40/129 C |
| 3,518,782 | 7/1970 | Long | 116/28 R X |
| 3,620,891 | 11/1971 | Jones, Sr. et al. | 40/104.03 |
| 3,797,151 | 3/1974 | Dexter | 40/129 C |
| 3,936,967 | 2/1976 | Davis | 40/125 C |

*Primary Examiner*—Daniel M. Yasich
*Attorney, Agent, or Firm*—Frederick E. Bartholy

[57] ABSTRACT

Erectable sign structure consisting of two boards interconnected so as to be placed in a V-formation and magnetically secured to a metallic body, such as a motor car. The outer surface of the structure is adapted to hold information sheets for display, indicating various emergency situations facing the motorist. The information sheets are permanently secured to the structure in a fold-over manner so as to be selectively chosen by the user.

4 Claims, 4 Drawing Figures

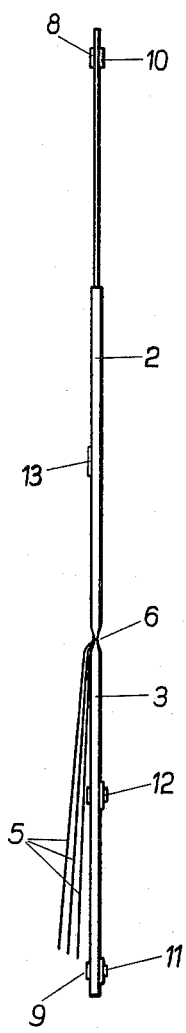
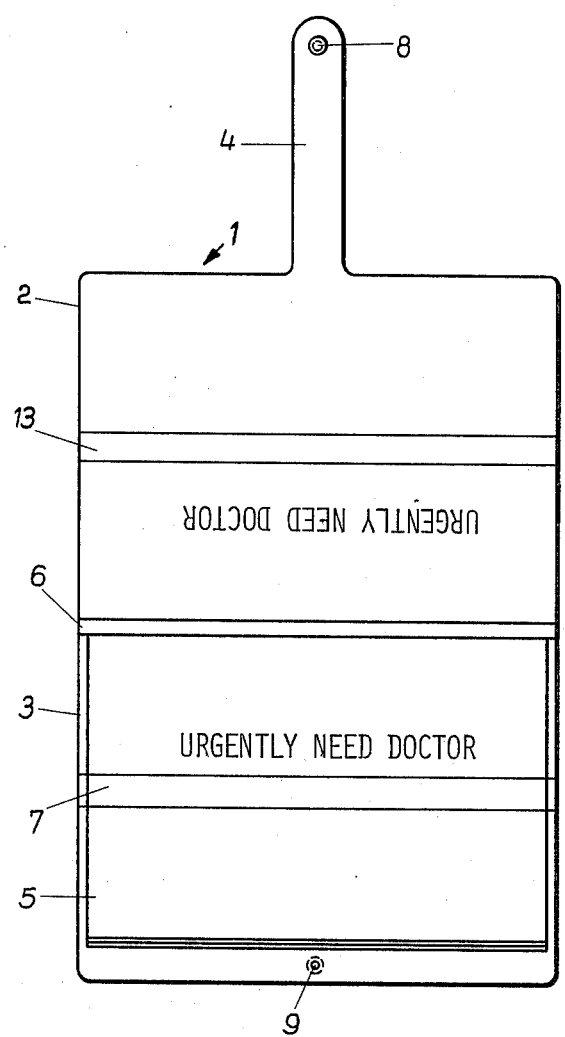

Fig. 3
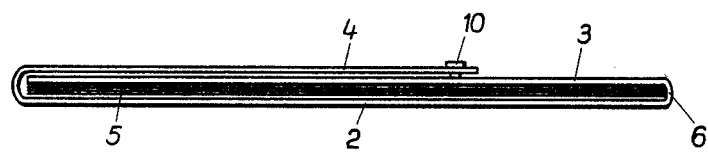
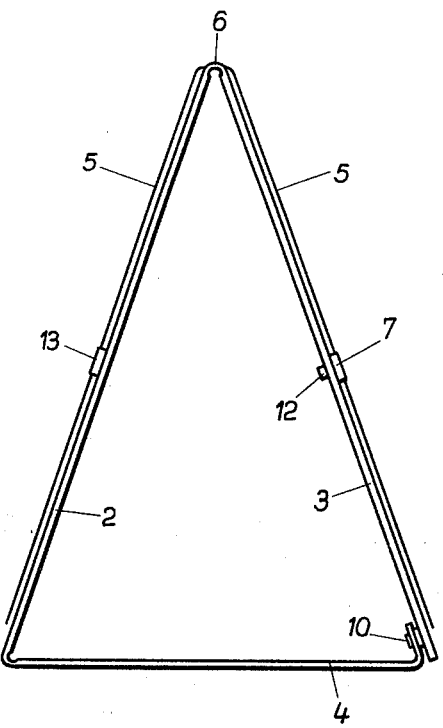
Fig. 4

ERECTABLE SIGN FOR INDICATING EMERGENCY IN MOTOR VEHICLE TRAFFIC

This invention pertains to a novel erectable sign construction in order to indicate an emergency situation in motor vehicle traffic. It consists of two stiff boards which are so interconnected as to form a structure which can be displaced at an angle of approximately 360°. Means are provided for securing the boards in a folded condition as well as in a V-formation when erected.

The signalling of an emergency is of course generally effected by sound, namely, the shrieking of an ambulance or police car, or by intercom. The average driver has no such means at his command; consequently, must rely on visual presentation of his plight.

In such cases, it is advantageous to indicate the particular problem which the operator of the motor vehicle is facing, some of which might not necessarily involve the car itself. Other conditions necessitate the call for help or announcement of an emergency; for example, the need for medical help in case of personal distress.

Accordingly, it is necessary to have a visual signalling device which explicitly indicates the trouble for which help is needed.

A signalling device which extends to meet the requirement to be used in connection with motor cars is described in German Petty Patent No. 73 33 341.2. This consists of two stiff boards tied together by means of plastic material. These may be displaced at an angle of 360°. At the inner side of the boards there is provided a pocket made of transparent plastic adapted to hold various types of signs which display certain needs, such as "URGENTLY NEED DOCTOR" or "PLEASE PROVIDE TOWING". When the device is erected upon removing a securing means, the two boards may be separated at an angle of about 350° and secured in this shape by suitable holding means. It is now possible to remove the intended sign from the pocket and place it on the outer side of the stack.

When this is accomplished, the assembly may be placed in front, at the side, or behind the vehicle so that it will be visible to cars passing on the road.

A drawback of the above-described signalling device is the fact that the signs to be displayed are placed in a pocket which must, of course, be so made that it is hermetically closed in order to protect it against rainwater. Water seepage into the pocket would damage the signs which may be of paper or cardboard. To make the pocket water-tight presents technical difficulties. Moreover, in case of an emergency, it is difficult to extricate the proper sign needed from the pocket. After use, it must be replaced in the pocket.

The object of the invention is a novel arrangement which has the advantage that no pocket is needed for storage of the signs. Nonetheless it provides a sign for any particular emergency in connection with accidents in motor car traffic and means extremely simple handling in such cases.

The above novel arrangement is achieved by utilizing several emergency signs which, at one end, are affixed to the board and may be selectively folded over at the point where they are fastened together.

In accordance with one modification of the invention, the display cards are of flexible material adapted to be bent.

A further embodiment of the novel arrangement is that, on at least one of the display boards, there is provided a band attached thereto under which the particular flexible information sheet may be placed.

A further modification of the novel arrangement is that the flexible display cards are made of weather resistant plastic material.

Furthermore, the novel arrangement contemplates gluing of the flexible, water-resistant information sheets made of plastic material to the display boards at the folding point thereof.

The advantage of this arrangement is that when the display boards are separated, the required information sheets are immediately available and need only simple securing means to one of the boards so that it will not be disturbed by sudden gusts of wind. In view of the fact that the information sheets are of water-resistant material, the danger that they may be destroyed by rain water is eliminated.

A particular advantage of the invention is that, although the information sheets are firmly secured to the support members, they may be turned over in their position. In this manner, the possibility of losing one of the sheets is eliminated. This can easily happen in the construction of the above-mentioned German Petty Patent, especially if the display board is turned upside down without first securing the pocket in which the display sheets are placed.

The improvement herein proposed is illustrated in the annexed drawings in which:

FIG. 1 is a plan view of the display board.

FIG. 2 is a side view of the illustration of FIG. 1.

FIG. 3 is a side view of the boards in collapsed condition.

FIG. 4 is a side view of the erected boards in operating condition.

Referring to the drawings, there is shown in FIG. 1 a sign board structure in opened condition consisting of an upper board 2, a lower board 3, a strap 4 and information sheets 5. Only a few of the sheets are illustrated in this figure. These are firmly attached to the connecting part 6 of the boards 2 and 3. The above-described assembly is preferably made of cardboard which is of adequate stiffness, yet allowing some flexibility. The cardboard is covered by a suitable plastic material, the purpose of which is to keep it water-resistant and easy to clean.

In accordance with FIG. 1, the information sheets 5 are made of plastic material which is quite flexible. This material may be of the same type as is used for the covering of the boards 2 and 3. Since the information sheets 5 are flexible, they can easily be turned over and slipped under transparent securing bands 7 and 13, respectively, which serve the purpose of preventing the turning over of the sheets due to the action of the wind.

Should the information sheets be made of stiff material, which is of course also possible, then the securing means may be made in the form of clasps which can be pivoted at a given point and moved over the information sheets.

In the assembly of the boards 1 and 2, it is immaterial whether the information sheets are flexible so that they may be bent or be made of stiff material. If desired, all parts may be made of plastic or at least covered by water resistant material. The important feature is that it is feasible to glue one edge of the information sheets to the boards 2 and 3.

At the junction point of the boards 2 and 3, the material 6 is more flexible so as to allow gluing of the information sheets 5. In this manner, these sheets may be turned over about 360°. Inasmuch as the information sheets 5 are solidly secured, they cannot be exchanged one for another. In order to display them, the boards 2 and 3 or the information sheets 5 must be placed in an arrangement which may be similar to a ring-type binder. The simplest form of such an arrangement consists of an open-end spiral support made of plastic material. It is of course possible to consider a different type of fastening arrangement which may represent a clamp-type holder and allows a simple exchange of information sheets.

The strap 4 has, at the upper end, a snap fastener — more specifically, the button member thereof — which, when the signalling boards are folded over, cooperates with the fitting of such fastener positioned on the back side of the board 3. At the lower edge of the board 3 there is provided the complementary member of the fastener over which the button member of the snap fastener 8 is snapped when the boards are erected into a V-shape.

FIG. 2 shows a side view of the sign board structure shown in FIG. 1. Both boards 2 and 3, the information sheets 5, the strap 4, the interconnecting portion 6, as well as the snap fastener button member 8 are illustrated. In addition, the complementary member 10 of the snap fastener and both snap fasteners 11 and 12 are clearly indicated.

FIG. 3 shows the sign board structure 1 in folded condition. In this form, the assembly may easily be placed in a motor car since it takes up very little room.

The constituent parts can easily be distinguished in this figure, namely, the boards 2 and 3, the strap 4, the counterpart 10 of the snap fastener, together with a few information sheets 5.

Finally, in FIG. 4, the signalling board structure 1 is illustrated in such a position as is used in practice. The two boards 2 and 3 are placed in a V-formation which is held in this position by the strap 4. The information sheets 5, which stand out somewhat at the connecting place of the boards 2 and 3, are placed over the boards and secured thereto by the retaining bands 7 and 13, respectively, against undesired foldover. The complementary part 10 of the snap fastener 8 is folded over the fastening head 11 (FIG. 2) so that the fastener 12 remains free since the latter is only used when the signalling device is in a folded condition.

In accordance with an advantageous modification of the invention, the strap 4 may contain a permanent magnet (not shown) placed in the center thereof. Consequently, in the erected manner, it is feasible to secure the signalling device on the top of a car to be held fast against gusts of wind. In order to prevent a rotation of the erected signalling boards over the permanent magnet, it is feasible to use two magnets which are so placed that one is at one end of the strip 4 and the other near the other end thereof. It is particularly advantageous if the reinforcing pasteboard within the strip 4 has indentations in which the permanent magnets may be placed.

The information sheets may have printing on one or both sides. It is also possible to have printing on the boards 2 and 3 in order to obtain maximum utilization of the surfaces.

The invention in its broader aspects is not limited to the specific embodiments herein shown and described but changes may be made within the scope of the accompanying claims without departing from the principles of the invention and without sacrificing its chief advantages.

What is claimed is:

1. Erectable board structure for signalling distress in situations involving motor vehicle traffic comprising two stiff boards so interconnected as to be relatively displaceable at an angle of nearly about 360°, fastening means being provided for holding said boards in a folded condition for transport and in an erected condition so as to form a V-shaped structure on base means for placing on a vehicle, characterized in that near the interconnection (6) of both said boards (2,3), several selectable printed information sheets (5) are so secured that said sheets may be turned at an angle of approximately 360°, whereby the sheets selected for display on said vehicle indicate the nature of the distress faced by the motorist.

2. Erectable board structure in accordance with claim 1 characterized in that the information sheets (5) are exchangeable and, at the interconnection of the boards (2,3), are secured by suitable fastening means such as a ring-type binder.

3. Erectable board structure in accordance with claim 1 characterized in that, at least on one of the boards (2,3), means are provided for securing information sheets (5) to the boards (2,3).

4. Erectable board structure in accordance with claim 1 characterized in that over at least one of said boards (2,3) there is provided a retaining band, the ends of said band being fastened thereto and under which the information sheets (5) may slideably fit.

* * * * *